June 12, 1956 L. MACKTA 2,749,761
REDUCING GEAR ASSEMBLY
Filed July 13, 1955 2 Sheets-Sheet 1
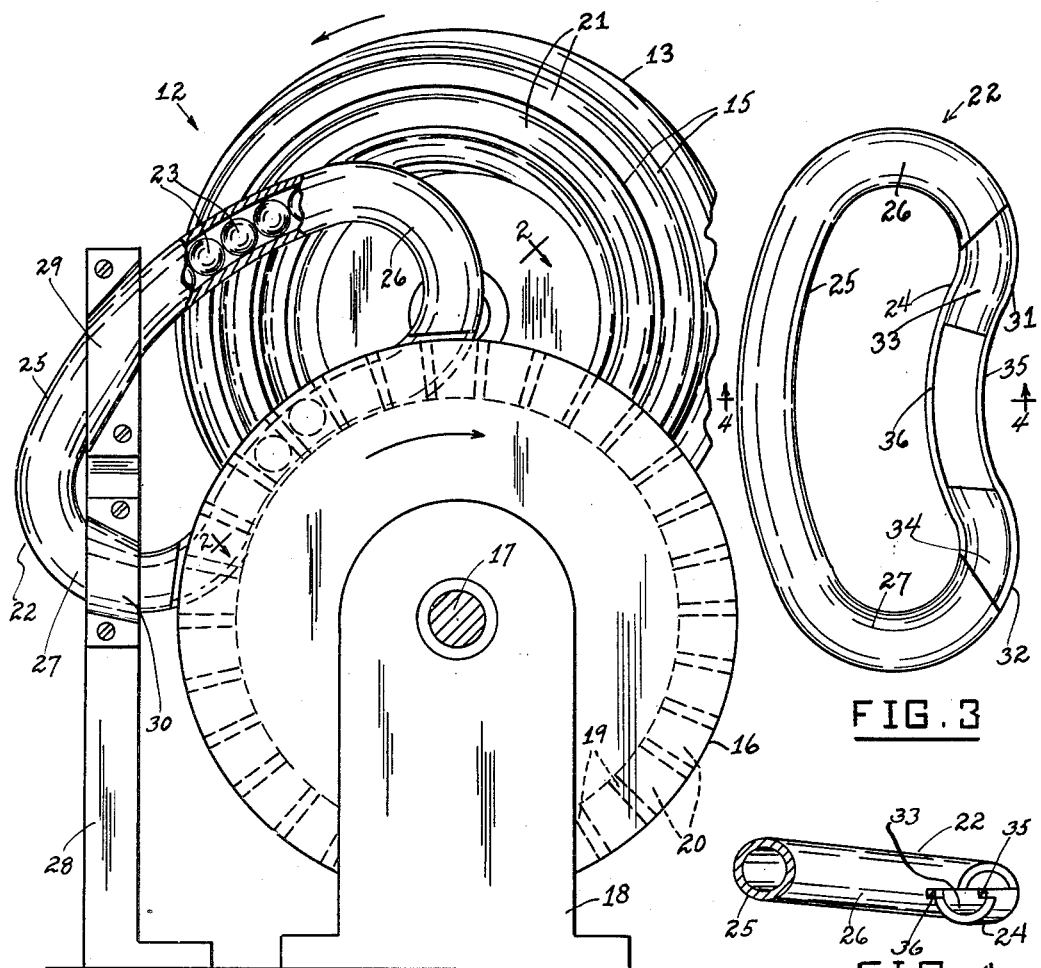
FIG.1
FIG.3
FIG.4
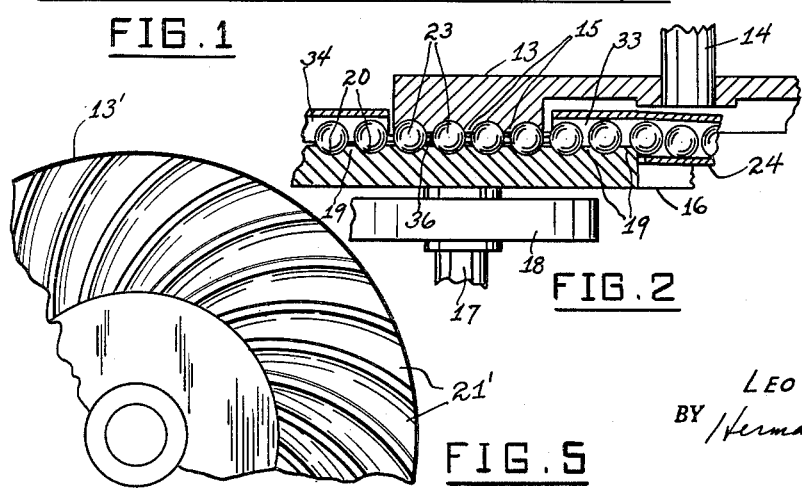
FIG.5
FIG.2
INVENTOR.
LEO MACKTA
BY Herman L. Gordon
ATTORNEY June 12, 1956  L. MACKTA  2,749,761
REDUCING GEAR ASSEMBLY
Filed July 13, 1955  2 Sheets-Sheet 2

INVENTOR.
LEO MACKTA
BY Herman L. Gordon
ATTORNEY

United States Patent Office 2,749,761
Patented June 12, 1956

2,749,761

REDUCING GEAR ASSEMBLY

Leo Mackta, Brooklyn, N. Y.

Application July 13, 1955, Serial No. 521,748

8 Claims. (Cl. 74—216.3)

This invention relates to gear reducing devices, and more particularly to a gear reducing assembly of the type employing a spiral driving gear.

A main object of the invention is to provide a novel and improved gear reducing assembly which is simple in construction, which is compact in size, and which provides positive drive on a driven gear in a direction substantially normal to the teeth of said driven gear, with minimum wear on the coupled parts of the assembly.

A further object of the invention is to provide an improved gear reducing assembly of the type employing a spiral driving gear and a spur gear mounted on an axis parallel to the axis of the driving gear, said assembly involving relatively inexpensive parts, being subject to a minimum amount of rubbing friction, whereby wear is minimized, and being substantially non-reversible, whereby the assembly is substantially locked when there is no torque applied to the driving gear.

A still further object of the invention is to provide an improved gear reducing mechanism affording a large ratio of speed reduction, being positive in action, and requiring minimum lubrication.

Further objects and advantages of the invention will become apparent from the following description and claims, and from the accompanying drawings, wherein:

Figure 1 is a front elevational view, partly in cross-section, of a gear reducing assembly constructed in accordance with the present invention, the driven shaft of said assembly being shown in vertical transverse cross-section.

Figure 2 is a fragmentary cross-sectional view taken on line 2—2 of Figure 1.

Figure 3 is a front elevational view of the ball recirculating conduit employed in the assembly of Figure 1.

Figure 4 is a cross-sectional view taken on line 4—4 of Figure 3.

Figure 5 is a fragmentary elevational view of a modified form of spiral driving gear which may be employed with the assembly of Figure 1.

Figures 6, 7:
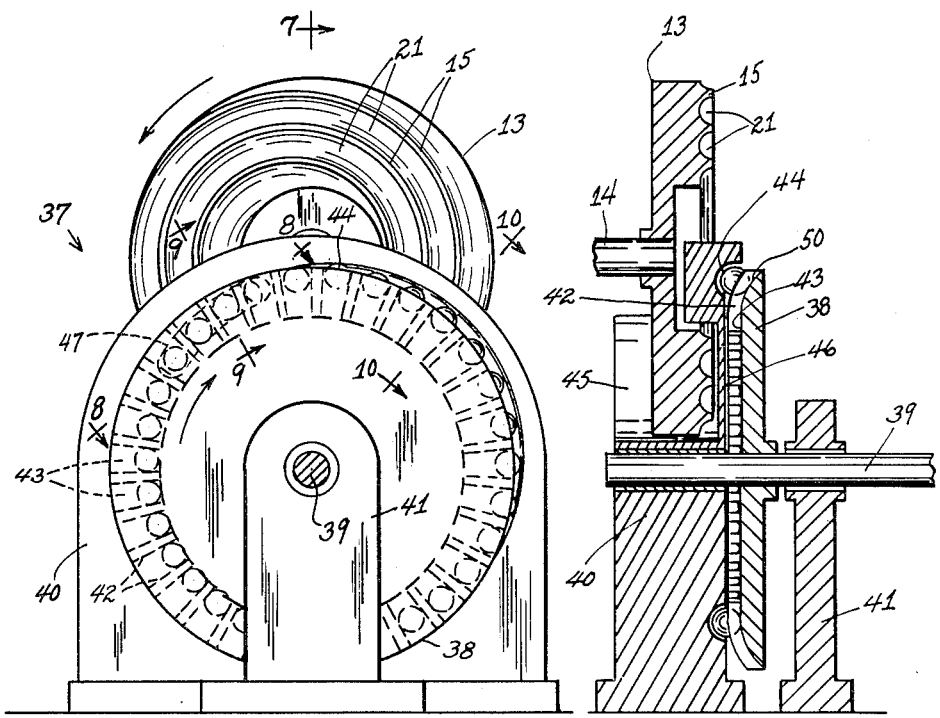
Figure 6 is a front elevational view of a modified form of gear reducing assembly according to the present invention.
Figure 7 is a transverse vertical cross-sectional view taken on line 7—7 of Figure 6.
Figure 8:
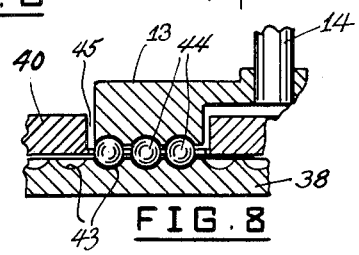
Figure 8 is a cross-sectional detail view taken on line 8—8 of Figure 6.
Figures 9, 10:
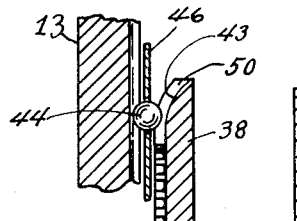
Figure 9 is a cross-sectional detail view taken on line 9—9 of Figure 6.
Figure 10 is a cross-sectional detail view taken on line 10—10 of Figure 6.

Referring to the drawings, and more particularly to Figures 1 to 4, 12 generally designates one form of gear reducing assembly according to the present invention. The gear reducing assembly 12 comprises a spiral driving gear 13 secured on a driving shaft 14, which is suitably supported on journal means, not shown.

The spiral gear 13 has the spaced spiral ribs 15 on its face, defining spiral grooves 21 therebetween.

Designated at 16 is a spur gear which is secured on a shaft 17 arranged parallel to the driving shaft 14, and suitably journalled, as, for example, in an upstanding bearing bracket 18. The spur gear 16 is located adjacent to spiral gear 13 and is formed at the peripheral portion of its inner face with the radial rib elements 19, defining radial grooves 20 therebetween.

As shown in Figure 1, the spur gear 16 overlaps the face of the spiral gear 13 and is arranged so that the radial grooves 20 at the peripheral portion of its inside face may be substantially registered with the spiral grooves 21 at the overlapping portions of the gears, the average spacing between the radial ribs 19 being substantially the same as the spacing between the successive rib elements 15 on spiral gear 13.

Designated at 22 is a ball conduit containing recirculating balls 23 which are employed to transmit torque from the spiral driving gear 13 to the driven spur gear 16. The conduit 22 is formed with the parallel arcuate inner and outer side portions 24 and 25 which are connected by the respective generally semicircular end loop portions 26 and 27. The conduit 22 is rigidly supported adjacent a set of registering overlapping grooved portions of the gears 13 and 16 in any suitable manner, as, for example, by an upstanding bracket 28 provided with clamping straps 29 and 30, respectively overlying the outer arcuate conduit portion 25 and the lower conduit loop portion 27, and clampingly securing these conduit portions to the upstanding bracket 28 in the position shown in Figure 1.

The inner arcuate side portion 24 of the ball conduit 22 is cut away at the front portions thereof adjacent the respective end loops 26 and 27, as shown at 31 and 32 in Figure 3, to define ball channel portions 33 and 34 and to provide clearance for the radial ribs 19 adjacent the overlapping grooved portions of gears 13 and 16. The inner arcuate portion 24 of the conduit 22 is further cut away between the channels 33 and 34 to define a pair of parallel arcuate ball race rods 35 and 36 which are thin enough to be received in the space between the grooved overlapping gear portions and to serve as ball guides therebetween, guiding the balls 23 for movement between the channels 33 and 34 during the operation of the mechanism.

As shown in Figure 4, the outer arcuate conduit portion 25 is offset with respect to the inner arcuate conduit portion 24 to provide clearance for the spiral rib elements 15 above the overlapping grooved gear portions.

The opposing grooves 21 and 20 are preferably of a depth equal to substantially one third the diameter of the gear balls 23, but may be any depth sufficient for the transmission of driving torque from the spiral driving gear to the driven spur gear 16. The spacing between the inner faces of the gears is such that the gear balls 23 are simultaneously in working contact with both the grooves 21 in spiral gear 13 and the radial grooves 20 in spur gear 16 at the overlapping portions of said grooves, as shown in Figure 2.

In operation, rotation of spiral gear 13 moves the gear balls 23 between the guide rods 35, 36 and thus applies torque to the spur gear 16 in a direction substantially normal to the radial teeth or ribs 19 of the spur gear. Assuming counterclockwise rotation of spiral gear 13 in Figure 1, the balls will be moved from channel 34 toward channel 33, causing the spur gear 16 to be rotated clockwise. The balls will then enter channel 33 and will be moved upwardly through loop 26 and will be recirculated through the conduit 22, being fed between the overlapping grooves 21 and 20 from the lower channel 34.

If the direction of rotation of spiral gear 13 is clockwise, the balls will travel in the direction opposite to that above described, causing the spur gear 16 to be rotated counterclockwise.

The number of turns of the spiral gear groove on the driving gear and the number of radial gear grooves on the spur gear will determine the speed reduction ratio of the assembly. The spiral gear may have spiral grooves less than the full circumference of the spiral gear body, or may make several turns from the inside to the outside of the body. One continuous spiral groove may be employed, or several parallel grooves, which of course would be necessary for grooves shorter than a full circumference of the gear body. Figure 5 illustrates a spiral driving gear, designated at 13', wherein a plurality of relatively short, side-by-side spiral grooves 21' are employed on the spiral gear.

The engaging coupling surfaces are preferably suitably hardened to minimize wear. The effect provided by the gear assembly is equivalent to that of a worm gear assembly in preventing reversed transmission of torque from the spur gear 16 to the spiral gear, which is preferable in some applications, such as in reducing gear assemblies for turbo-prop engines, to prevent "windmilling" of the propeller with the engine of the aircraft deenergized.

Referring now to Figures 6 to 11, 37 generally designates a modified form of gear reducing assembly according to this invention, said assembly comprising a spiral gear 13 secured on a driving shaft 14, as in the previously described form of the invention. Designated at 38 is a spur gear which is secured on a shaft 39 arranged parallel to the driving shaft 14 and suitably journalled in a first upstanding bearing member 40 and a second upstanding bearing member 41, said bearing members being spaced to receive the spur gear 38 therebetween, as shown in Figure 7.

The spur gear 38 is formed at the peripheral portion of its inner face with the radial ribs or spur teeth 42, defining radial grooves 43 therebetween. The spur gear 38 overlaps the spiral gear 13 so that certain of the radial grooves 43 register with portions of the spiral grooves 21 and are spaced to receive balls 44 therebetween.

The bearing member 40 is formed at its rear portion with an arcuate groove 45 in which the thickened peripheral portion of gear 13, carrying the spiral grooves 21, is rotatably received, as shown in Figure 7. The relatively thin wall 46 of groove 45 is disposed between the opposing grooved inside faces of gears 13 and 38 and is formed with an arcuate slot 47 forming part of a generally circular race channel 48 formed in bearing member 40 on the surface thereof facing the spur gear 38.

Slot 47 traverses the overlapping region between spiral grooves 21 and spur grooves 43 wherein said spiral grooves register with the spur grooves, and the ends of slot 47 communicate with the race groove 48 so that balls 44 may pass smoothly from the race groove 48 into one end of slot 47 and then may leave the opposite end of the slot and resume movement along race groove 48.

Figure 11:
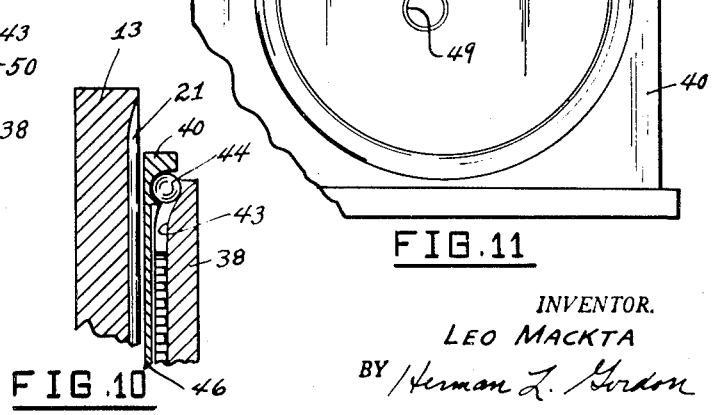
Figure 11 is a fragmentary front elevational view of the ball guide member employed in the gear reducing assembly of Figure 6.

As shown in Figure 11, the race groove 48 is eccentric with respect to the shaft bearing 49 in member 40 in a direction upwardly and toward the side of member 40 oposite slot 47, and the radial ribs 42 and grooves 43 of spur gear 38 are curved arcuately and away from member 40 at the peripheral portion of the spur gear, as shown in Figure 7 at 50, to enable the radial spur grooves 43 to continuously move the balls 44 through the eccentric race groove 48 as the spur gear 38 rotates.

In operation, the balls in the arcuate slot 47 transmit torque from spiral gear 13 to the spur gear 38, the balls being moved in a direction substantially normal to the radial spur ribs 42. The balls are moved continuously around the race groove 48 by this action, so that there are always balls available to transmit torque from spiral gear 13 to spur gear 38. As viewed in Figure 6, counterclockwise rotation of spiral gear 13 produces clockwise rotation of spur gear 38. Conversely, clockwise rotation of spiral gear 13 produces counterclockwise rotation of the spur gear.

While certain specific embodiments of an improved gear reducing assembly have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a gear reducing assembly, a driving gear, means on the face of said driving gear defining a spiral groove, a driven gear mounted adjacent said driving gear and having a peripheral portion overlapping a portion of said spiral groove, means on said driven gear defining recesses arranged to register with said portion of the spiral groove, race means disposed between said gears and extending from the inner portion to the outer portion of the grooved face of the driving gear along the recessed portion of the driven gear, and ball members in said race means engaging simultaneously in said spiral groove and the recesses of the driven gear and drivingly coupling said driven gear to said driving gear.

2. In a gear reducing assembly, a driving gear, means on the face of said driving gear defining a spiral groove, a driven gear mounted adjacent said driving gear and having a peripheral portion overlapping a portion of said spiral groove, means on said driven gear defining recesses arranged to register with said portion of the spiral groove, race means disposed between said gears and extending from the inner portion to the outer portion of the grooved face of the driving gear along the recesses on the driven gear, ball members in said race means engaging simultaneously in said spiral groove and said recesses and drivingly coupling said driven gear to said driving gear, passage means connecting the ends of said race means, and additional ball members in said passage means sufficient to substantially fill said passage means, whereby said ball members may circulate continuously through said race means and passage means when the gears rotate.

3. In a gear reducing assembly, a driving gear having a spirally grooved face, a spur gear rotatably mounted adjacent to and parallel to said face, means defining grooves on the peripheral portion of the spur gear substantially registrable with the spiral groove of the driving gear, race means between the gears extending along said peripheral portion across the spiral groove, passage means connecting the ends of the race means, and ball members substantially filling said passage means and race means and being of a diameter to simultaneously engage in said spiral groove and the peripheral grooves of said spur gear while being supported in said race means.

4. In a gear reducing assembly, a driving gear having a spirally grooved face, a spur gear rotatably mounted adjacent to and parallel to said face, radial grooves at the peripheral portion of the face of said spur gear adjacent said spirally grooved face and being registrable with the spiral groove therein, race means between the gears extending along said peripheral portion substantially transversely across the spiral groove, passage means connecting the ends of the race means, and ball members substantially filling said passage means and race means and being of a diameter to simultaneously engage in said spiral groove and the peripheral grooves of said spur gear while being supported in said race means.

5. In a gear reducing assembly, a driving gear having a spirally grooved face, a spur gear rotatably mounted in overlapping relation to and parallel to said face, radial ribs on the peripheral portion of the face of the spur gear defining radial grooves at said peripheral portion substantially registrable with the spiral groove of the driving gear and being substantially equal in width and substantially equal in spacing to said spiral groove, race means between the gears extending along said peripheral portion substantially transversely across the spiral groove, passage means connecting the ends of the race means, and ball members substantially filling said passage means and race means and being of a diameter to simultaneously engage in said spiral groove and the peripheral grooves of said spur gear while being supported in said race means.

6. In a gear reducing assembly, a driving gear having a spirally grooved face, a spur gear rotatably mounted in overlapping relation to and parallel to said face on an axis parallel to the axis of the driving gear, means defining radial grooves at the peripheral portion of the spur gear substantially equal in width, substantially equal in spacing and substantially registrable with the spiral groove of the driving gear, race means between the gears extending along said peripheral portion substantially transversely across the spiral groove, passage means connecting the ends of the race means, and ball members substantially filling said passage means and race means and being of a diameter to simultaneously engage in said spiral groove and the peripheral grooves of said spur gear while being supported in said race means, whereby said ball members are driven along said race means by said spiral groove responsive to rotation of said driving gear, and whereby torque is transmitted by the ball members to the spur gear.

7. In a gear reducing assembly, a driving gear having a spirally grooved face, a spur gear rotatably mounted adjacent to and parallel to said face in overlapping relation thereto, means defining grooves at the peripheral portion of the spur gear substantially registrable with the spiral groove of the driving gear, race means between the gears extending along said peripheral portion across the spiral groove, a tubular conduit connecting the ends of the race means, and ball members substantially filling said conduit and race means and being of a diameter to simultaneously engage in said spiral groove and the peripheral grooves of said spur gear while being supported in said race means.

8. In a gear reducing assembly, a driving gear having a spirally grooved face, a spur gear rotatably mounted adjacent to and parallel to said face in overlapping relation thereto, means defining grooves at the peripheral portion of the spur gear substantially registrable with the spiral groove of the driving gear, race means between the gears extending along said peripheral portion across the spiral groove, passage means connecting the ends of the race means, and ball members substantially filling said passage means and race means and being of a diameter to simultaneously engage in said spiral groove and the peripheral grooves of said spur gear while being supported in said race means, said passage means comprising a body mounted between the gears and formed with a groove connecting the ends of the race means and extending adjacent the grooved peripheral portion of the spur gear.

No references cited.